United States Patent [19]

Kishi et al.

[11] Patent Number: 4,609,804
[45] Date of Patent: Sep. 2, 1986

[54] ARC WELDING APPARATUS

[75] Inventors: Tomomi Kishi, Toyota; Yoshiroh Awano, Nagoya; Yasuhide Takao, Toyota, all of Japan

[73] Assignee: Toyota Jidosha Kabushiki Kaisha, Japan

[21] Appl. No.: 639,510

[22] Filed: Aug. 10, 1984

[30] Foreign Application Priority Data

Aug. 25, 1983 [JP] Japan .................. 58-155647

[51] Int. Cl.⁴ .................. B23K 9/28; B23K 35/38
[52] U.S. Cl. ...................... 219/74; 219/136; 219/137.43
[58] Field of Search .............. 219/136, 74, 137.2, 219/137.31, 137.42, 137.43

[56] References Cited
FOREIGN PATENT DOCUMENTS

| 74106 | 3/1983 | European Pat. Off. ......... 219/137.9 |
| 1934638 | 2/1971 | Fed. Rep. of Germany ...... 219/136 |
| 1508337 | 7/1971 | Fed. Rep. of Germany ...... 219/136 |
| 39449 | 11/1971 | Japan ................................. 219/74 |

Primary Examiner—Clarence L. Albritton
Assistant Examiner—C. M. Sigda
Attorney, Agent, or Firm—Parkhurst & Oliff

[57] ABSTRACT

A method and apparatus are provided for removing spatter from a torch of a gas shielded arc welding apparatus. After a series of welding operations are completed, pressurized air mixed with a small amount of oil is injected through a passage defined between a member supplying a welding electrode and a gas nozzle. This oil emitted adheres to the surface of the electrode supply member and the gas nozzle, thereby generating an oil film thereon. The pressurized air removes any spatter on the apparatus and the oil film prevents any further spatter from adhering to the surface.

10 Claims, 4 Drawing Figures

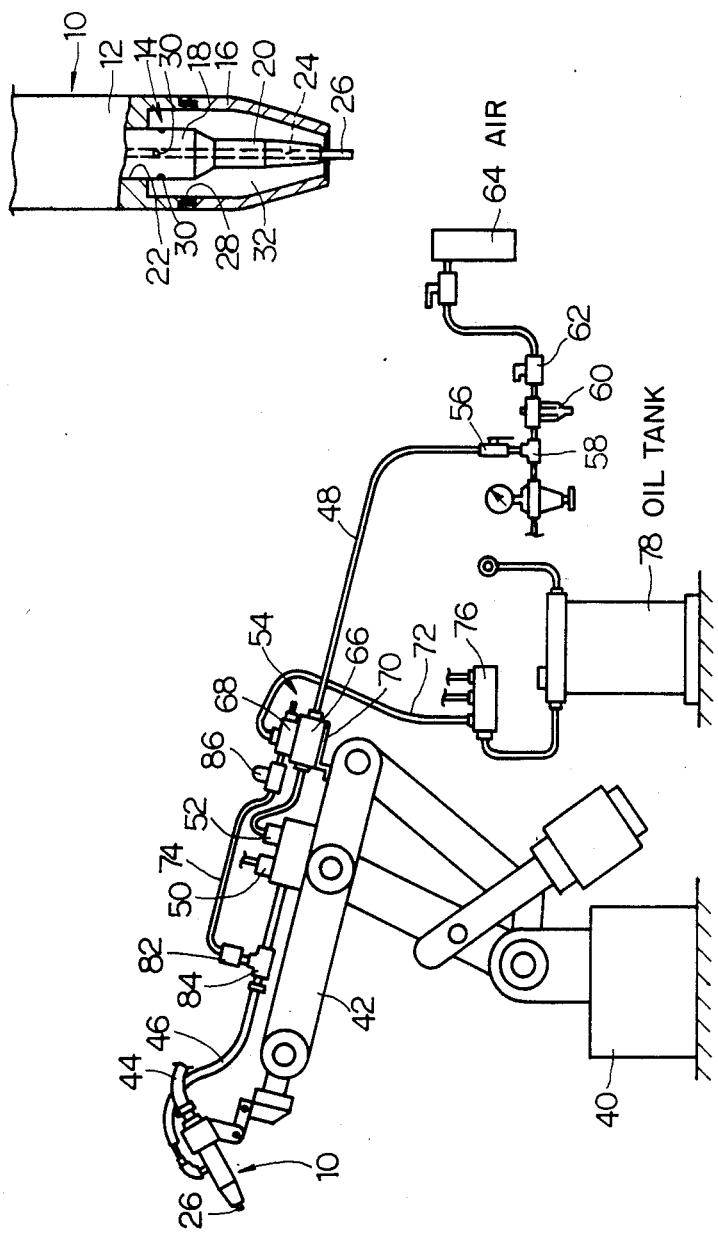

ARC WELDING APPARATUS

BACKGROUND OF THE INVENTION

The present invention relates to an apparatus for removing spatter from an arc welding torch, and more particularly to a device for removing spatter which is adhered to a gas shielded arc welding torch.

One kind of a gas shielded arc welding torch employs a consumable electrode. In this gas shielded arc welding torch employing a consumable electrode, two types of welding have been known. The first type of welding is called $CO_2$ welding in which carbon dioxide is employed as a shield gas. The second type of welding is metal active gas (MAG) welding in which argon gas is employed as a shield gas. FIG. 1 illustrates an arc welding torch. The torch 10 has a main body 12, a cylindrical member 14 fixed to the main body 12, and a gas nozzle 16. The cylindrical member 14 comprises a large diameter portion 18 and a small diameter portion 20. The large diameter portion 18 of the cylindrical member 14 is fitted into a penetrating hole 22 defined at the central portion of the main body 12, and the portion 18 is fixed to the main body 12. The cylindrical member 14 has a guide hole 24 therein which extends in the longitudinal direction of the cylindrical member 14. A wire, which is employed as a consumable electrode, is designed to be fed through the guide hole 24 from the small diameter portion 20 to the outside. Further, the main body 12 of the torch 10 is provided at its tip end with a hole 28 having a circular cross section whose diameter is larger than the diameter of the penetrating hole 22. The cylindrical gas nozzle 16 is screwed to the tip end of the main body 12, which surrounds the hole 28. The gas nozzle 16 surrounds the cylindrical member 14 therein. The gas nozzle 16 is radially inwardly inclined from its longitudinal intermediate portion to its longitudinal tip end. When a gas shielded arc weld is made, the shield gas supplied from a gas supply device is emitted from a plurality of gas holes 30 which are formed in the large diameter portion 18 of the cylindrical member 14. Further, the injected gas passes through a passage 32 having an annular cross section, defined between the gas nozzle 16 and the cylindrical member 14 and injects from the tip end of the gas nozzle 16 to the outside, thereby shielding the area around the portion where the tip end of the wire 26 and a part of a metal to be welded are melted by the arc generated between the wire 26 and the metal to be welded.

By conducting experiments in which the above-described torch 10 is employed, the following table was obtained, which indicates the amount of the spatter adhered to the torch and the degree of the influence of the spatter on the formation of a blowhole.

| POSITION OF SPATTER TO BE ADHERED | AMOUNT OF SPATTER TO BE ADHERED | INFLUENCE ON BLOWHOLE |
| --- | --- | --- |
| BOTTOM PORTION OF THE HOLE 28 | SMALL | SMALL |
| BOUNDARY PORTION BETWEEN THE LARGE DIAMETER PORTION 18 AND THE SMALL DIAMETER PORTION 20 OF THE CYLINDRICAL MEMBER 14 | MEDIUM | MEDIUM |
| TOP AND INNER SURFACES OF THE GAS NOZZLE 16 | LARGE | LARGE |
| TOP SURFACE OF THE CYLINDRICAL MEMBER 14 | MEDIUM | SMALL |

Once a small amount of spatter adheres, more spatter is inclined to accumulate quickly. If no countermeasure for removing the spatter which has adhered is made, the spatter will disturb the smooth flow of the shield gas. This will cause a blowhole to occur at the portion to be welded which is disadvantageous. From the above table, it is apparent that a medium or large amount of spatter adheres to the boundary between the large diameter portion 18 and the small diameter portion 20 of the cylindrical member 14, and also to the top and inner surfaces of the gas nozzle 16. Thus, spatter adheres to the tip of the passage 32 in a greater quantity than at the gas holes 30. Hence, the flow of shield gas is easily disturbed. This influences the occurrence of a blowhole in metal to be welded considerably. To prevent the blowhole from occurring, it is necessary to clean the torch 10 and remove the spatter which has adhered. According to the prior art approach, the gas nozzle 16 had to be disassembled and the spatter which had adhered had to be removed using an air gun or a brush. This operation took about five minutes for one operation. Further, blowholes occur at irregular intervals and the frequency of occurrence of blowholes was high. Hence, to completely obviate the occurrence of adhered spatter, the number of cleanings has to increase, thus the time for cleaning increases and this lowers the efficiency of operation of the welding equipment.

SUMMARY OF THE INVENTION

The present invention was made in view of the foregoing background and to overcome the foregoing drawbacks. It is accordingly an object of this invention to provide an apparatus for efficiently removing spatter which adheres to a torch for use in a gas shielded arc welding apparatus.

To attain the above objects, the appratus of the present invention includes a means for mixing oil into pressurized air after a welding operation is finished. The pressurized air mixed with the oil is injected through a passage defined between a member for supplying a welding electrode and a gas nozzle. It is injected toward a portion of a metal to be welded. The injection of the pressurized air mixed with the oil, coats the surface of the member which supplies the welding electrode and the inner surface of the gas nozzle with an oil. This generates an oil film on the surfaces of the electrode supplying member and the gas nozzle. Hence, even if spatter does adhere to the surfaces of the member and the gas nozzle, the spatter is easily blown away by the subsequent injection of the pressurized air.

BRIEF DESCRIPTION OF THE DRAWINGS

The above objects, features and advantages of the present invention will become more apparent from the following description of the preferred embodiments taken in conjunction with the accompanying drawings, wherein:

FIG. 1 is a partial cross-sectional front view of a torch used for gas shielded arc welding;

FIG. 2 is a general view of a gas shielded arc welding apparatus;

DETAILED DESCRIPTION OF THE PREFERRED EMBODIMENTS

Figure 3:
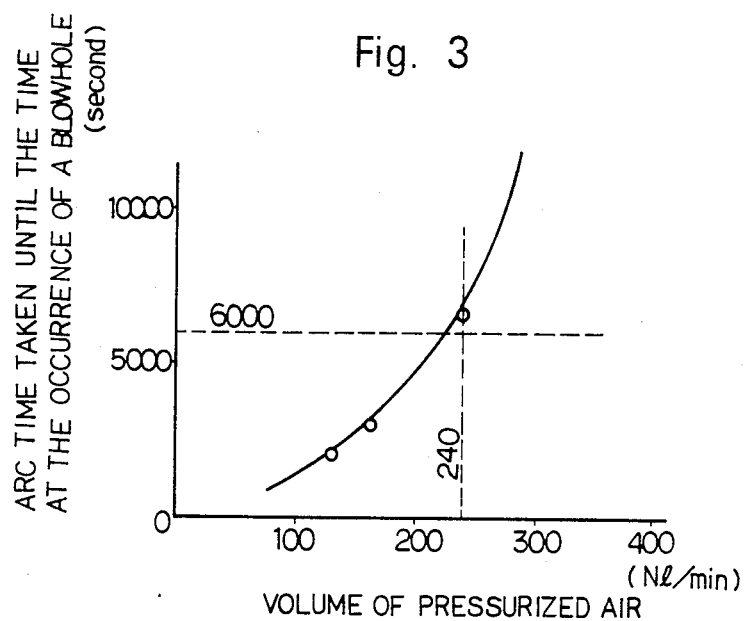
FIG. 3 is a graph which illustrates the relationship between the volume of pressurized air emitted and the time of use of the arc welding apparatus before the occurrence of a blowhole.

The present invention is described in detail with reference to the accompanying drawings which illustrate different embodiments of the present invention.

In FIG. 2, numeral 40 designates a welding robot which is designed to periodically perform a predetermined welding operation. A torch 10 is mounted on the tip end of an arm 42 of the welding robot 40. The structure of the torch 10 is illustrated in FIG. 1. The torch 10 has a main body 12, a cylindrical member 14 fixed to the main body 12, and a gas nozzle 16. The cylindrical member 14 comprises a large diameter portion 18 and a small diameter portion 20. The large diameter portion 18 of the cylindrical member 14 is fitted into a penetrating hole 22 defined at the central portion of the main body 12, and is fixed to the main body 12. The cylindrical member 14 has a guide hole 24 therein which extends in the longitudinal direction of the cylindrical member 14. A wire, which is employed as a consumable electrode, is designed to be fed through the guide hole 24 from the small diameter portion 20 to the outside. Further, the main body 12 of the torch 10 is provided at its tip end with a hole 28 having a circular cross section whose diameter is bigger than that of the penetrating hole 22. The cylindrical gas nozzle 16 is screwed to the tip end of the main body 12, which surrounds the hole 28. The gas nozzle 16 surrounds the cylindrical member 14 therein. The gas nozzle 16 is radially inwardly inclined from its longitudinal intermediate portion to its longitudinal tip end. When a gas shielded arc welding is made, the shield gas supplied from a gas supply device is emitted through a plurality of gas holes 30 which are formed in the large diameter portion 18 of the cylindrical member 14. Further, the emitted gas passes through a passage 32 having an annular cross section, defined between the gas nozzle 16 and the cylindrical member 14, and flows from the tip end of the gas nozzle 16 to the outside, thereby shielding the area where the tip end of the wire 26 and the part of the metal to be welded are melted by the arc generated between the wire 26 and the metal. According to the present embodiment, the inside diameter of the gas nozzle 16 at its tip end is 14 mm, and the diameter of the small diameter portion 20 at its tip end is 6.3 mm.

The torch 10 is connected with a guide tube 44 which guides the wire 26 as a consumable electrode from a reel (not shown in drawings), a gas supply hose 46 which supplies carbon dioxide as a shield gas therein, and a cable (not shown in drawings) which feeds electric current for use in gas shield arc welding. An air supply hose 48 is connected to the gas supply hose 46. The air supply hose 48 supplies pressurized air as a pressurized gas. Electromagnetic valves 50 and 52 are provided at the connecting points between the hoses 46 and 48. When the valve 50 opens, the carbon dioxide is supplied to the torch 10. When the valve 52 opens, the pressurized air is supplied to the torch 10. The carbon dioxide or the pressurized air is alternatively supplied to the torch 10 by the opening or closing of both valves 50 and 52. According to the present embodiment, when the valve 50 closes and the valve 52 opens, the portion of the gas supply hose 46 between the torch 10 and the connecting point with the hose 48 serves as the air supply passage.

Air is introduced from an inlet opening 64 and then flows through a cock 62, a filter 50, a three-way coupling joint 58, and a cock 56 to a pump 54. The pump 54 comprises an actuating portion 66 and a main portion 68. The pump 54 is fixed by a mounting bracket 70 to the arm 42. The actuating portion 66 includes a diaphragm which extends in the direction for crossing the air supply hose 48. The diaphragm is constantly biased by a spring toward the right in FIG. 2. When the pressurized air is supplied to the diaphragm, the diaphragm allows the pressurized air to flow through a hole defined at the center portion of the diaphragm thus restricting the flow of the pressurized air. This restriction generates a difference in pressure between the sides of the diaphragm, and this difference of pressure biases the diaphragm against the force of the spring, thereby actuating a pump plunger located in the main portion 68. Two oil supply hoses 72 and 74 are connected to the main portion 68 of the pump 54. The other end of the hose 72 is connected through a distributor 76 with an oil tank 78. The other end of the hose 74 is connected through a check valve 82 and a three-way coupling joint 84 to the gas supply hose 46 at such a position so that the connecting point is as close to the torch 10 as possible. The reason the connecting point is as close to the torch 10 as possible, is that the exact volume of the oil supplied into the hose 46 is supplied to the torch 10 and the electromagnetic valve 52 can be operated without being influenced by the supplied oil. The numeral 86 designates a window through which a worker can confirm whether or not the oil is supplied. Part of the pressurized air is supplied to the oil tank 78, and the oil stored in the oil tank 78 is supplied to the main portion 68 of the pump 54 with the use of the pressure of the pressurized air. When the pressurized air is supplied into the air supply hose 48, the plunger within the main portion 68 of the pump 54 is actuated by the diaphragm, and the predetermined exact volume of oil stored in the main portion 68 is supplied into the oil supply hose 74. Further, the supplied oil is changed into an oil mist by the flow of the pressurized air in the three-way coupling joint 84. This oil mist is mixed into the pressurized air, and this mixture is supplied into the torch 10.

In operation of the above-described apparatus, first the valve 52 opens and pressurized air is supplied from the air supply hose 48 to the gas supply hose 46. The flow of the pressurized air, actuates the plunger provided within the main portion 68 of the pump 54. The actuation of the plunger causes an exact amount of oil to be supplied to the oil supply hose 74. The oil is changed to a mist by the flow of the pressurized air in the three-way coupling joint 84. This oil mist is supplied into the torch 10 through the gas holes 30. While the oil mist flows in the passage 32, the oil mist adheres to the inner and tip end surfaces of the gas nozzle 16 and the outer peripheral surface of the cylindrical member 14, thereby forming an oil film thereon. After the oil mist and the pressurized air are emitted, the valve 52 is closed and the valve 50 is opened. The carbon dioxide is then supplied through the gas supply hose 46 into the torch 10. The welding robot 40 then begins to operate, and the wire 26 is supplied from the tip end of the cylindrical member 14. The carbon dioxide is then emitted from the gas nozzle 16, thereby providing the gas shield for the arc welding operation.

When the arc weld is made in the above-described way, a spatter splashes from the welded point toward the torch 10 and adheres onto the cylindrical member 14 and the gas nozzle 16. The surfaces of the cylindrical member 14 and the gas nozzle 16 are coated with the oil. Hence, the spatter cannot easily adhere to the surfaces. Further, as the splashed spatter is rapidly cooled by the oil coated on the surfaces, the spatter is solidified. Even if a small amount of spatter adheres to the surfaces, the force from the weight of the spatter which can be sustained by the cylindrical member 14 and the gas nozzle 16 is lowered by the oil film coated on the surfaces. Hence, if some amount of spatter adheres onto the previously adhered spatter, the weight of the whole amount of the spatter exceeds the amount of the adhesive force of the spatter. Finally, the adhered spatter is forced to drop by its weight. As a result, the flow of the carbon dioxide is almost not disturbed by the spatter.

Immediately after a series of welding operations end, the valve 50 closes and the valve 52 opens to supply pressurized air into the gas supply hose 46. This makes the oil mist and the pressurized air inject into the passage 32. The spatter adhered onto the gas nozzle 16 and the cylindrical member 14 is blown out by the pressurized air, and the adhered spatter is removed. Moreover, by this injection of oil mist, the oil film is again coated on the inner and tip end surfaces of the gas nozzle 16 and the surface of the cylindrical member 14.

Thus, if the pressurized air and the oil mist are injected immediately after the end of a series of welding operations, the adhered spatter is removed. In this case, if the pressurized air is emitted at a flow speed higher than a predetermined value and a predetermined volume of oil is supplied into the torch per one injection of the pressurized air, the spatter is removed and it is not necessary to clean the torch 10.

Figure 4:
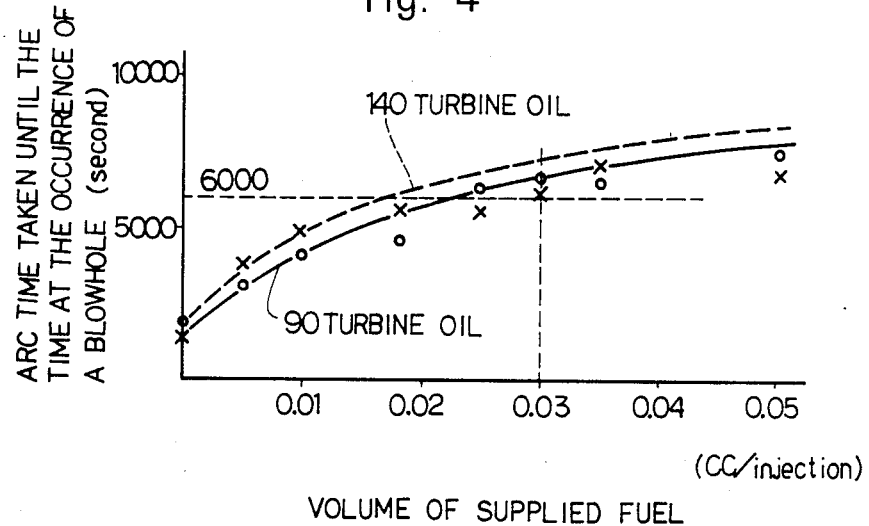
FIG. 4 is a graph which illustrates the relationship between a volume of fuel supplied per one injection of a shield gas and the time of use of the arc welding apparatus before the occurrence of a blowhole.

FIG. 3 illustrates a graph showing the relation between a volume of pressurized air and the use of the arc welding apparatus until the occurrence of a blowhole. In particular, FIG. 3 illustrates the time until a blowhole is generated when the volume of pressurized air is varied while 0.03 cc of oil is supplied per one injection of the pressurized air. FIG. 4 illustrates experimental results when the volume of supplied oil varies while 240 Nl/min of pressurized air is supplied. From FIGS. 3 and 4, if the pressurized air supplied is greater than or equal to 240 Nl/min and the mist of 90 turbine oil added is greater than or equal to 0.03 cc per one injection of the pressurized air, it is apparent that the blowhole does not occur until the cumulative time of arc welding reaches at least 6000 seconds. According to the typical arc welding operation, the operation continues for up to 4 hours. Further, in general, the cumulative time of the arc welding operation does not reach 6000 seconds. Hence, during the welding operation, no interruptions to clean the torch are necessary. It is sufficient for a worker to check the spatter at the commencement of work. If cleaning the torch is necessary this can be done at other times. As shown in FIG. 4, 140 turbine oil can be used instead of 90 turbine oil.

According to the above embodiment, the method of the present invention is applied to a welding robot. However, this method can be applied to semi-automatic arc welding such as a torch which is manually operated to weld. Also, according to this embodiment, the gas nozzle is radially inclined, but it also may be straight.

While the present invention has been described in its preferred embodiments, it is to be understood that the invention is not limited thereto, and may be otherwise embodied within the scope of the following claims.

We claim:
1. An arc welding apparatus comprising
   an arm;
   a torch mounted on said arm, said torch including a gas nozzle and a welding electrode, a passage being defined between said gas nozzle and said welding electrode;
   a first connecting pipe and a second connecting pipe;
   a valve means which is in communication through said first connecting pipe with said passage between said gas nozzle and said welding electrode, said valve means functioning to selectively introduce either pressurized air or a shield gas into the first connecting pipe;
   a tank; and
   a pump which functions to introduce oil from said tank into said first connecting pipe through said second connecting pipe, said pump introducing oil when said valve means introduces said pressurized air into said first connecting pipe.

2. The arc welding apparatus of claim 1, wherein said first connecting pipe has a first end connected to said valve means and wherein said second connecting pipe is connected to a portion of said first connecting pipe which is positioned far from said first end of said first connecting pipe, whereby said arc welding apparatus supplies an accurate amount of oil to the torch.

3. The arc welding apparatus of claim 2, wherein said arm includes a first end, said torch being mounted on said first end of said arm.

4. The arc welding apparatus of claim 3, wherein said arm includes an intermediate portion, said valve means being mounted on said intermediate portion of the arc welding apparatus.

5. The arc welding apparatus of claim 4, wherein said arm includes a second end, said pump being mounted on said second end of said arm of said arc welding apparatus.

6. The arc welding apparatus of claim 5, further comprising a check valve and a point of connection, said second connecting pipe being connected to said first connecting pipe at said point of connection, said check valve being located in said second connecting pipe near said point of connection.

7. The arc welding apparatus of claim 6, further comprising a third connecting pipe communicating said oil tank with said pump.

8. The arc welding apparatus of claim 7, wherein said valve means includes a first valve which functions to selectively introduce said pressurized air into said first pipe and a second valve which functions to selectively introduce said shield gas into said first pipe.

9. The arc welding apparatus of claim 8, further comprising a fourth connecting pipe and an air source, wherein said pump has an actuating portion and a main portion, said actuating portion communicating with said first valve of said valve means and said air source through said fourth connecting pipe, said actuating portion having an actuating means which actuates said main portion, said main portion communicating with said check valve and said oil tank through said third connecting pipe, whereby when said pressurized air is introduced from said air source to said first valve of said valve means through the actuating portion of the pump and the fourth pipe, said actuating portion and said main portion function to introduce said oil from said oil tank to said first pipe.

10. The arc welding apparatus of claim 9, wherein when said pressurized air is supplied at an amount greater than or equal to approximately 240 l/minute, and said oil is mixed into said pressurized air at an amount greater than or equal to 0.03 cc per minute.

\* \* \* \* \*